United States Patent
Franceschini et al.

(10) Patent No.: US 9,714,711 B2
(45) Date of Patent: Jul. 25, 2017

(54) LEAF SEAL

(71) Applicant: ROLLS-ROYCE PLC, London (GB)

(72) Inventors: Gervas Franceschini, Derby (GB); David Anthony Edwards, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/317,651

(22) Filed: Jun. 27, 2014

(65) Prior Publication Data
US 2015/0001808 A1 Jan. 1, 2015

(30) Foreign Application Priority Data
Jun. 28, 2013 (GB) .................................. 1311610.8

(51) Int. Cl.
F16J 15/3288 (2016.01)
F16J 15/3292 (2016.01)
F01D 11/00 (2006.01)

(52) U.S. Cl.
CPC .......... *F16J 15/3292* (2013.01); *F01D 11/00* (2013.01); *F16J 15/3288* (2013.01); *F05D 2240/57* (2013.01); *Y10T 29/49297* (2015.01)

(58) Field of Classification Search
CPC ................ F16J 15/3288; F16J 15/3292; F05B 2240/571; F05D 2240/57
USPC ........................ 277/355, 411, 412; 415/174.2
See application file for complete search history.

(56) References Cited

U.S. PATENT DOCUMENTS 5,183,197 A * 2/1993 Howe ........................... 228/160
5,201,530 A 4/1993 Kelch et al.
5,335,920 A * 8/1994 Tseng et al. ................... 277/303
5,474,305 A 12/1995 Flower
5,480,165 A * 1/1996 Flower .......................... 277/355

(Continued)

FOREIGN PATENT DOCUMENTS

DE 699 34 152 T2 3/2007
EP 0902221 A2 3/1999

(Continued)

OTHER PUBLICATIONS

Nov. 28, 2014 European Search Report issued in European Application No. 14174647.

(Continued)

*Primary Examiner* — Eugene G Byrd
(74) *Attorney, Agent, or Firm* — Oliff PLC

(57) ABSTRACT

A leaf seal is proposed for effecting a seal between two coaxial and relatively rotating components. The seal has an annular pack of stacked leaves, the pack being mountable to a first one of the components at root portions of the leaves and extending towards the other component such that end edges of the leaves cooperate to define a seal surface of the pack which is presented for air-riding interaction with a surface of the other component during relative rotation between the components such that, in use, a pressure drop is maintained axially across the pack. The seal surface of the pack incorporates a plurality of hydrodynamic lift-generating recesses spaced circumferentially around the pack. Each said recess extends circumferentially across a plurality of adjacent leaves in the pack, each of which leaves being spaced radially from said surface of the other component along at least part of its end edge.

14 Claims, 6 Drawing Sheets

(56) References Cited

U.S. PATENT DOCUMENTS

| | | | |
|---|---|---|---|
| 6,120,622 A * | 9/2000 | Mayr et al. | 148/516 |
| 6,267,381 B1 * | 7/2001 | Wright | 277/355 |
| 6,343,792 B1 * | 2/2002 | Shinohara et al. | 277/355 |
| 6,808,179 B1 | 10/2004 | Bhattacharyya et al. | |
| 7,487,588 B2 * | 2/2009 | Hogg et al. | 29/888.3 |
| 7,828,297 B2 * | 11/2010 | Hoebel et al. | 277/412 |
| 8,025,296 B2 * | 9/2011 | Uehara et al. | 277/412 |
| 8,152,462 B1 | 4/2012 | Williams | |
| 8,231,340 B2 * | 7/2012 | Howes | 415/174.2 |
| 8,393,859 B1 * | 3/2013 | Dillon | 415/173.5 |
| 8,585,058 B2 * | 11/2013 | Rhodes et al. | 277/355 |
| 8,608,174 B2 * | 12/2013 | Kono | 277/355 |
| 2002/0000694 A1 | 1/2002 | Justak | |
| 2002/0105146 A1 * | 8/2002 | Uehara et al. | 277/355 |
| 2003/0062685 A1 | 4/2003 | Inoue | |
| 2007/0018408 A1 * | 1/2007 | Kono | 277/355 |
| 2007/0120326 A1 * | 5/2007 | Rhodes et al. | 277/355 |
| 2009/0081028 A1 * | 3/2009 | Morgan et al. | 415/174.4 |
| 2009/0322038 A1 * | 12/2009 | Wright | 277/551 |
| 2011/0135453 A1 * | 6/2011 | Howes | 415/171.1 |
| 2011/0227289 A1 | 9/2011 | Stefan | |
| 2012/0093633 A1 * | 4/2012 | Kasibhotla et al. | 415/173.3 |
| 2013/0042456 A1 | 2/2013 | Anand et al. | |
| 2015/0014939 A1 | 1/2015 | Inoue | |

FOREIGN PATENT DOCUMENTS

| | | |
|---|---|---|
| EP | 0933567 A2 | 8/1999 |
| EP | 0902221 A3 | 2/2000 |
| EP | 0933567 A3 | 2/2000 |
| EP | 1 013 975 A1 | 6/2000 |
| EP | 2 532 838 A1 | 12/2012 |
| EP | 2 592 310 A1 | 5/2013 |
| FR | 2 650 048 | 1/1991 |
| GB | 2021209 A | 11/1979 |

OTHER PUBLICATIONS

Apr. 15, 2015 Search Report issued in European Application No. EP 14 17 4645.

Nov. 19, 2013 British Search Report issued. in British Application No. 1311610.8.

Nov. 11, 2013 British Search Report issued in British Application No. 1311607.4.

U.S. Appl. No. 14/317,905, filed Jun. 27, 2014 in the name of Franceschini et al.

Mar. 29, 2017 Office Action issued in U.S. Appl. No. 14/318,099.

* cited by examiner

LEAF SEAL

FIELD OF THE INVENTION

The present invention relates to a leaf seal.

BACKGROUND OF THE INVENTION

Leaf seals may be used to form a seal between two relatively rotating components in order to maintain a relatively high pressure on one side of the seal and a relatively low pressure on the opposite side of the seal. A leaf seal is arranged with a large number of typically rectangular leaves which are held at a defined angle (the "lay angle") to the radial all the way round the seal circumference. The leaves give the seal a low stiffness, and the leaves are packed together such that the total leakage through the seal is reduced. Nonetheless, interleaf gaps do provide the seal with a porous aerodynamic working section. Such seals may be used, for example, in gas turbine engines.

FIG. 1 shows schematically a cut-away perspective view of a portion of a leaf seal 31 comprising a pack of leaves 32. FIG. 2 shows (a) a view along the axial direction of an arc segment of the pack to better show some of the leaves 32 edge-on, and (b) a plan view of a single leaf 32.

The leaves 32 each have a root portion 40 and a working portion 41, and have a width w in the axial direction and a thickness t. The leaves alternate with spacer elements 33 at their root portions 40, and are secured thereat to a backing ring 34 of a housing, which typically also comprises front 35a (high pressure side) and rear (low pressure side) 35b rigid cover plates. The working portions 41 of the leaves 32 present end edges 36 towards a surface 37 of a rotating component (for example a shaft) generally rotating in the direction depicted by arrowhead 38. The leaves 32, and in particular the end edges 36 of the leaves 32, act against the surface 37 in order to create a seal across the assembly 31. Each leaf 32 is sufficiently compliant in order to adjust with rotation of the surface 37, so that a good sealing effect is created. The spacers 33 ensure that flexibility is available to appropriately present the leaves 32 towards the surface 37 which, as illustrated, is generally with an inclined angle between them. The spacers 33 also help to form interleaf gaps 39 between adjacent working portions 41 of the leaves 32. A leakage flow through these gaps 39 is induced by the pressure differential across the seal. Leaf seals of an air-riding configuration are configured such that the end edges 36 of the leaves adjacent the rotating component are presented with a small air gap therebetween such that the leaves ride on the air leakage through that gap to inhibit premature contact wear of the leaf seal elements against the surface of the rotating component. It will be understood that the air gap should be as narrow as possible such that air leakage is reduced to the minimal level possible whilst creating the air-riding effect, so as to limit actual leakage across the seal. However, it has been found that it can be difficult to generate sufficient hydrodynamic lift between the leaf pack and the rotating component to provide a satisfactory air-riding cushion between the two.

It is normal for all of the leaves 32 in the pack to have an identical configuration. As illustrated most clearly in FIG. 1, the resulting leaf pack thus defines an inner bore 42 around the rotating component which is substantially parallel to the outer surface 37 of the rotating component. Such an arrangement can thus be considered to behave rather like a parallel bearing when in use, in the sense that it provides limited potential for the generation of hydrodynamic lift due to the fact that it provides two substantially parallel and relatively rotating surfaces (represented by the inner bore 42 and the facing surface 37 of the rotating component. The result is a leaf seal with poor hydrodynamic lift which is thus prone to wear at the tips of the leaves defining the inner bore around the rotating component and/or on the surface of the rotating component itself. This limits the useful life of the leaf seal.

It is a preferred object of the present invention to provide an improved leaf seal.

SUMMARY OF THE INVENTION

In a first aspect, the present invention provides a leaf seal for effecting a seal between two coaxial and relatively rotating components, the seal having an annular pack of stacked leaves, the pack being mountable to a first one of the components at root portions of the leaves and extending towards the other component such that end edges of the leaves cooperate to define a seal surface of the pack which is presented for air-riding interaction with a surface of the other component during relative rotation between the components such that, in use, a pressure drop is maintained axially across the pack; wherein the seal surface of the pack incorporates a plurality of hydrodynamic lift-generating recesses arranged circumferentially around the pack, each said recess extending circumferentially across a plurality of adjacent leaves in the pack, each of which leaves being spaced radially from said surface of the other component along at least part of its end edge.

As will be appreciated, the leaf seal is thus preferably provided in the form of an air-riding leaf seal.

In a second aspect, the present invention provides a method of producing a leaf seal according to the first aspect, wherein the method includes a step of machining said recesses into the pack.

In a third aspect, the present invention provides a gas turbine engine, such as an aero gas turbine engine, having one or more leaf seals according to the first aspect.

Optional features of the invention are set out below. These are applicable singly or in any combination with any aspect of the invention.

The lift-generating recesses may either be provided in a circumferentially spaced-apart relationship to one another around the annulus of the leaf pack, or they may alternatively be provided adjacent one another around the leaf pack.

The seal surface is preferably defined as an inner bore extending through the annular pack of stacked leaves.

In preferred arrangements, the leaves of the stack are all tightly packed in the regions of their end edges such that there are no (or at least no substantial) gaps between the tips of the leaves. However, in alternative arrangements the leaves may be packed such that there are small gaps between their tips.

Optionally, at least one of said recesses may have a radial depth which varies across its circumferential extent. For example, at least one of said recesses may have a tapered circumferential profile.

Alternatively, or additionally, at least one of said recesses may have a constant radial depth across its circumferential extent.

The leaf seal of the invention may be configured such that said pack has a high pressure side and a low pressure side across which said pressure drop is maintained in use, and wherein at least one of said recesses extends across the entire axial width of the pack so as to be open to both the high and low pressure sides of the pack.

In such an arrangement, each leaf across which said at least one recess extends can be spaced radially from the surface of the other component along the full length of its end edge.

Alternatively, or additionally, the leaf seal arrangement may be configured such that at least one of said recesses extends only partially across the axial width of the pack so as to be open to only one side of the pack.

In such an arrangement, and where the pack has a high pressure side and a low pressure side across which said pressure drop is maintained in use, it is possible for the or each said recess to be open to the high pressure side of the pack.

Furthermore, each leaf across which said at least one recess extends may have an end edge profile configured such that i) an upstream region of the end edge, adjacent the high pressure side of the pack, is spaced radially from the surface of the other component, and ii) a downstream region of the end edge, adjacent the low pressure side of the pack, is provided in closer, intimate, relationship with the surface of the other component.

The leaf seal arrangement may be configured such that at least one of said recesses has a radial depth which varies over its axial extent.

The leaf seal arrangement may also, or alternatively, be configured such that at least one of said recesses has a circumferential dimension which varies over its axial extent.

In any of the aforementioned arrangements, the leaves in the pack across which the lift-generating recesses do not extend circumferentially may be each arranged such that their end edges are located closer to the surface of the other component than at least part of the end edges of the leaves across which the recesses do extend.

The leaf seal can be used, for example, in gas and steam turbines, and jet engines. However, it may also be used in other applications, e.g. where sealing between a high and low pressure region is required along a shaft.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 3:
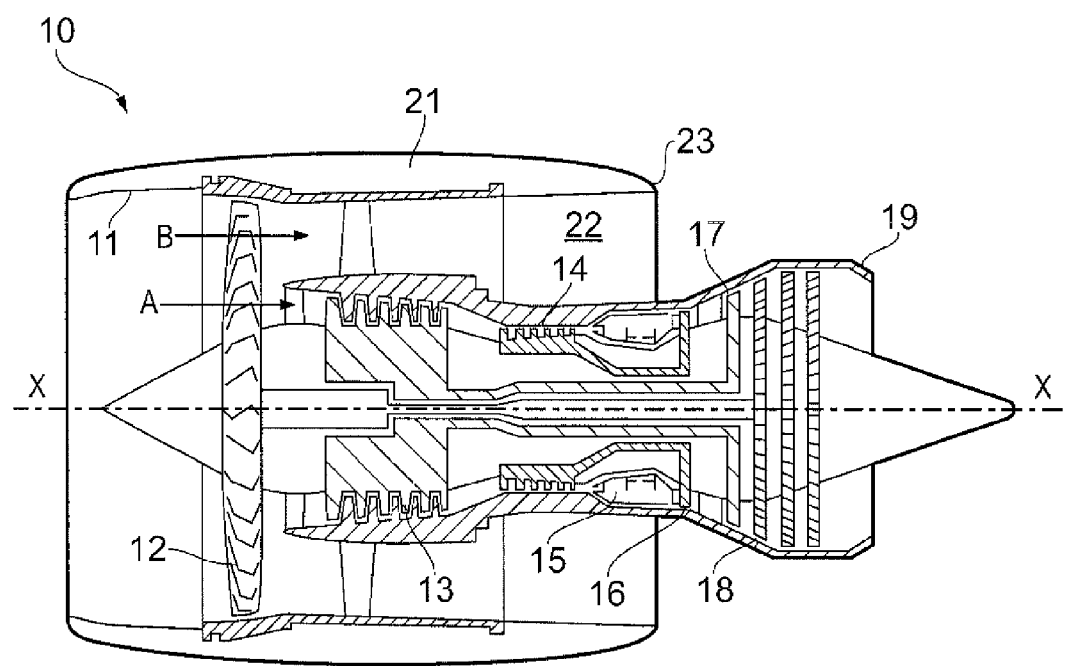
FIG. 3 shows schematically a longitudinal section through a gas turbine engine.

With reference to FIG. 3, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The engine has one or more leaf seals installed, for example, between an interconnecting shaft and a casing for the shaft.

Figure 1:
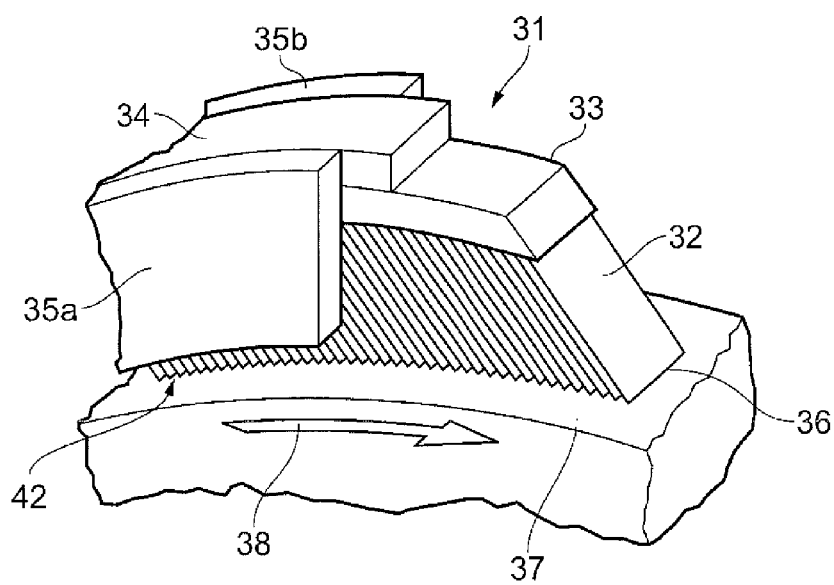
FIG. 1 shows schematically a cut-away perspective view of a portion of a leaf seal.
Figure 2:
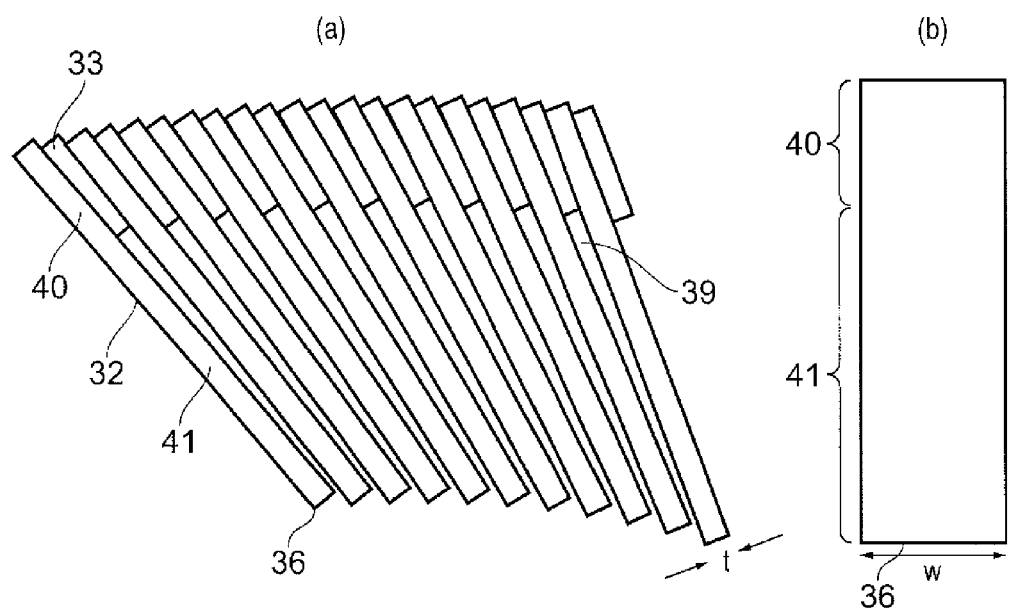
FIG. 2 shows (a) a view along the axial direction of an arc segment of the pack of leaves of the seal of FIG. 1, and (b) a plan view of a single leaf of the seal of FIG. 1.
Figure 4:
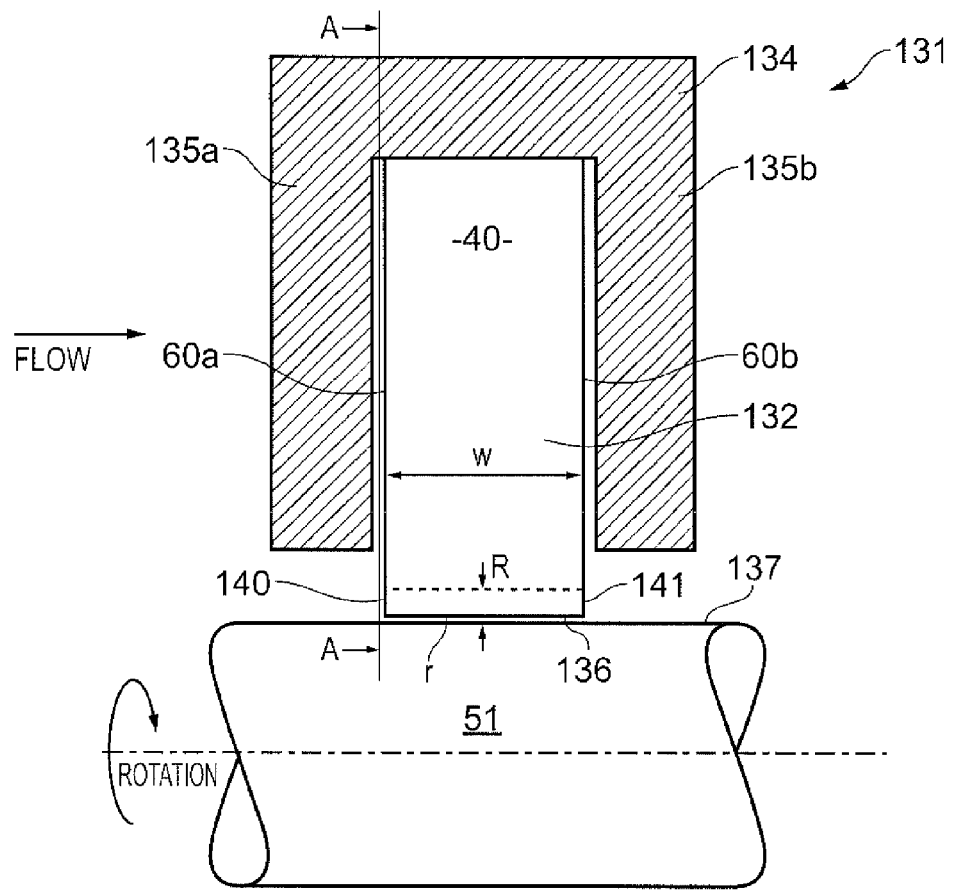
FIG. 4 is a schematic radial cross-sectional view through part of a leaf seal in accordance with an embodiment of the present invention.

FIG. 4 shows, schematically, a radial cross-sectional view through part of an air-riding leaf seal 131 in accordance with the present invention. In a generally conventional manner, the leaf seal has an annular pack 50 of individual leaves 132. The pack 50 of leaves 132 is shown schematically in FIG. 5 in an "unrolled" configuration, as viewed from the upstream side of the seal (the left-hand side in FIG. 4). The pack of leaves 132 is arranged and mounted relative to the surface 137 of a rotor 51 in a generally similar manner to the conventional arrangement illustrated in FIGS. 1 and 2.

The leaf seal thus has an annular pack 50 of approximately rectangular leaves 132 terminating at radially inward end edges 136 which are presented for air-riding interaction with the surface 137 of rotor 51 in a manner which will be described in more detail below. The leaves are held at an inclined angle to the radial. Interleaf gaps may be formed between the leaves 132, giving a porous aerodynamic working section and sufficient compliance to adjust to the rotor. Nonetheless, the leaves are packed sufficiently tightly together so that the total leakage through the seal is low.

As illustrated most clearly in FIG. 4, the root portions 40 of the leaves are held in a housing 134 which includes an upstream (high pressure) cover plate 135a and a downstream (low pressure) cover plate 135b which each cover a portion of the radial extent of the leaf pack in a generally conventional manner. Each leaf 132 has an upstream (high pressure) side edge 60a and a downstream (low pressure) side edge 60b.

Figure 5:
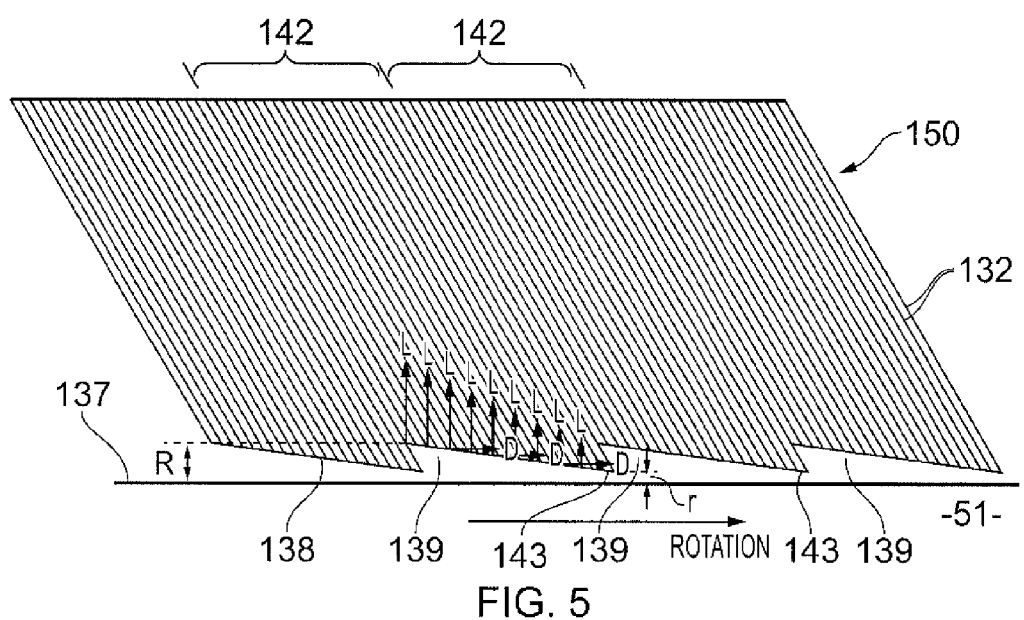
FIG. 5 is a schematic drawing showing part of the leaf seal of FIG. 4, as viewed from line A-A on the upstream side in FIG. 4, and which shows an "unrolled" section of the leaf pack.

As illustrated most clearly in FIG. 5, the leaves 132 are arranged with respect to one another so that their end edges collectively define a seal surface 138 of the pack 50. The seal surface 138 is arranged to face the surface 137 of the rotor 51 and is presented for air-riding interaction with the rotor surface 137. In the arrangement illustrated, in which the pack 50 is provided in the form of an annulus around the rotor 51, the seal surface 138 is defined as an inner bore through the annular pack 50, and receives the rotor 51 therethrough.

As also clearly illustrated in FIG. 5, the seal surface 138 incorporates a plurality of recesses 139 which are arranged circumferentially around the pack 50. In the particular arrangement illustrated in FIGS. 4 and 5, each recess 139 extends across the entire axial width w of the pack of leaves 132 so as to be open to both the high pressure (upstream) side of the pack (indicated at 140 in FIG. 4) and the low pressure (downstream) side of the pack (indicated at 141 in FIG. 4).

Each recess 139 extends circumferentially across a plurality 142 of adjacent leaves 132 in the pack. As can be seen in FIG. 5, each of the plurality 142 of leaves across which the recesses 139 extend are spaced radially from the surface 137 of the rotor 51 along the full length of their end edges 136. However, the actual radial spacing of each leaf varies over the circumferential extent of each recess. In the arrangement illustrated in FIGS. 4 and 5, the radial spacing of the individual leaves across which each recess 139 extend ranges from a minimum spacing r in the case of a leaf 143 at one circumferential limit of the recess 139, to a maximum spacing R in the case of a leaf 144 at the opposite circumferential limit of the recess. The radial depth of each recess 139 thus varies across the circumferential extent of the recess 139. In the particular arrangement illustrated, the recesses 139 each have a tapered, wedge-shaped, circumferential profile.

It is proposed to form the recesses 138 in the pack 50 by machining the surface 137 of the pack defined by the end edges 136 of the constituent leaves 132 after the pack has been assembled. However, it is to be appreciated that other methods for the formation of the recesses 138 could be used.

During rotational operation of the leaf seal arrangement 131, the recesses 139 in the seal surface 138 function in the manner of Rayleigh steps to generate lift forces L acting between the ends of the leaves and the rotor surface 137, and also drag forces D. The recesses 139 provide these lift forces via entrainment of the flow in the boundary layer around the rotating rotor 51, which thus creates a circumferential variation in pressure around the leaf pack 50. Because the leaves 132 are packed tightly against one another (either with very small gaps between their end regions, or actually touching at their end regions), the lift generated by the hydrodynamic pressure variation caused by the recesses 139 is transferred to neighbouring leaves by mechanical deflection and/or mechanical loading, such that the entire leaf pack experiences an increase in hydrodynamic lift around its annular extent. An effective air-riding cushion is thus created between the leaf pack 50 and the rotating surface 137 of the rotor shaft 51. In the preferred embodiment, the leaves 132 are very tightly packed at their ends with no gaps therebetween. By tightly packing the end regions of the leaves in this way, mechanical loads are more effectively transferred between the leaves, thereby improving the lift-generating ability of the pack 50 as a whole and improving the tendency of the leaves to lift as a group, whilst providing a substantially continuous seal surface 138 without gaps between the leaf tips.

Figure 6:
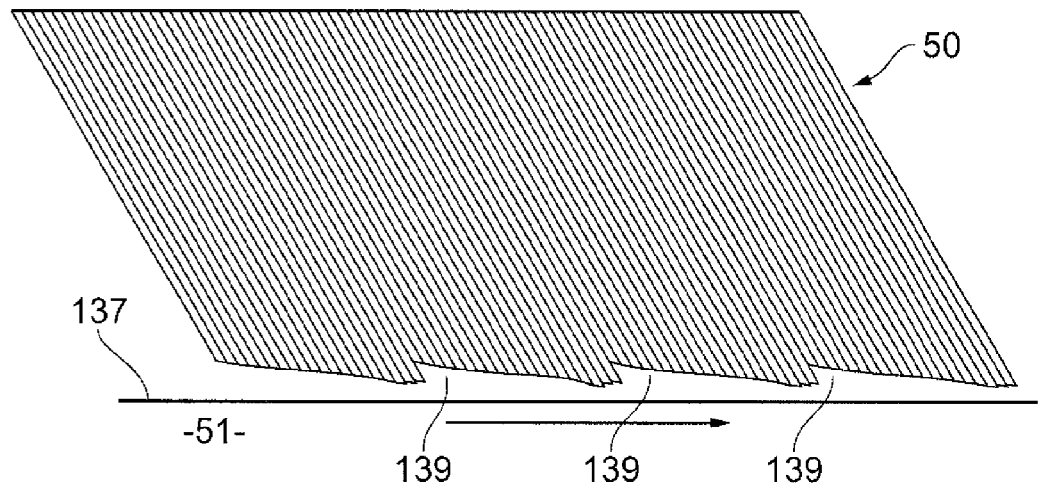
FIG. 6 is a schematic drawing similar to that of FIG. 5, but which shows distortion to the leaf pack under running conditions.
Figure 7:
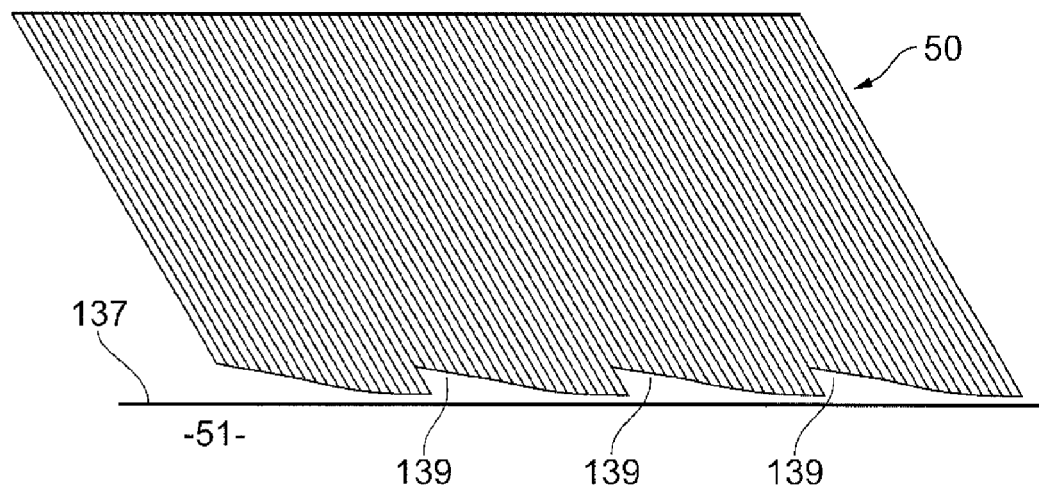
FIG. 7 is another schematic drawing similar to that of FIG. 5, showing a modified leaf pack profile designed to mitigate or eliminate the distortion illustrated in FIG. 6.

Because the leaves 132 each remain independent of one another, despite being packed tightly at their end edges 136, the seal surface 138 which they cooperate to define can be subject to radial deformation in response to the hydrodynamic pressure profile arising from the recesses 139 during rotational operation of the seal. An example of such deformation is illustrated schematically in FIG. 6, from which it can be seen that the hydrodynamic pressure profile arising from the lift-generating recesses 139 has effectively deformed the shape profile of the recesses 139. In order to avoid negative effects of such deformation on the lift-generating effect of the recesses 139 when operating at high rotational speeds, it is therefore proposed to adjust the shape profile of the recesses, in their static state, in order to compensate for such deformation. An example of such modified recesses 139 is illustrated schematically in a static condition in FIG. 7, and is designed to compensate for deformation arising in the running condition so that the recesses 139 then adopt a deformed shape profile similar to those illustrated in FIG. 5.

Analysis will be required for various types of seal arrangement, and their intended operating conditions, in order to derive the most suitable deformation-compensating profile to generate reliable lifting forces over all intended operating conditions. The recess profiles may, for example, be adjusted in terms of their taper-shape, their circumferential extent, and/or their radial depth.

Figure 8:
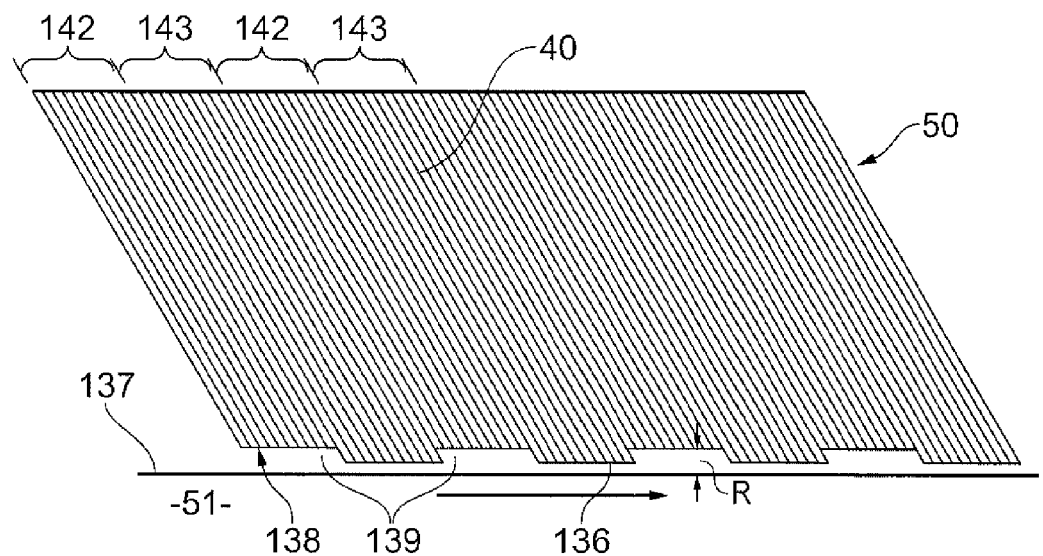
FIG. 8 is schematic drawing similar to that of FIGS. 5 to 7, showing another possible leaf pack profile in accordance with the invention.

An alternative configuration of lift-generating recesses 139 is illustrated in FIG. 8. In this arrangement, it will be noted that the recesses 139 are provided in a circumferentially spaced-apart relationship to one another around the annulus of the leaf pack 50, which is in contrast to the arrangement illustrated in FIG. 5 in which the recesses are provided immediately adjacent one another. Between the groups 142 of adjacent leaves 132 across which the recesses 139 extend, there are thus groups 143 of adjacent leaves 132 across which the recesses 139 do not extend. The leaves 132 across which the recesses 139 do not extend are longer, as measured from their root portions to their end edges 136, than the leaves across which the recesses 139 do extend, and are thus arranged thus that their end edges 136 are closer to the facing surface 137 of the rotor 51. The end edges 136 of the leaves across which the recesses do not extend are furthermore presented in close, intimate relationship to the surface 137 of the rotor 51.

As also clearly illustrated in FIG. 8, the circumferential shape profile of the recesses 139 is different to the previously described embodiments. In this arrangement, the recesses 139 each have a constant radial depth R across their entire circumferential extent, and thus provide a step-like profile to the seal surface 138, which is in contrast to the tapered, wedge-like profile of the previously described arrangements. Nevertheless, the recesses 139 still generate hydrodynamic lift L in substantially the same manner, and thus still function in the manner of Rayleigh steps in the seal surface 138.

As will be appreciated, in each of the embodiments described above, the lift-generating recesses 139 extend across the entire axial width of the pack of leaves 132 so as to be open to both the high pressure (upstream) side of the pack and the low pressure (downstream) side of the pack. However, alternative axial configurations of recesses 139 are also possible.

Figure 9:
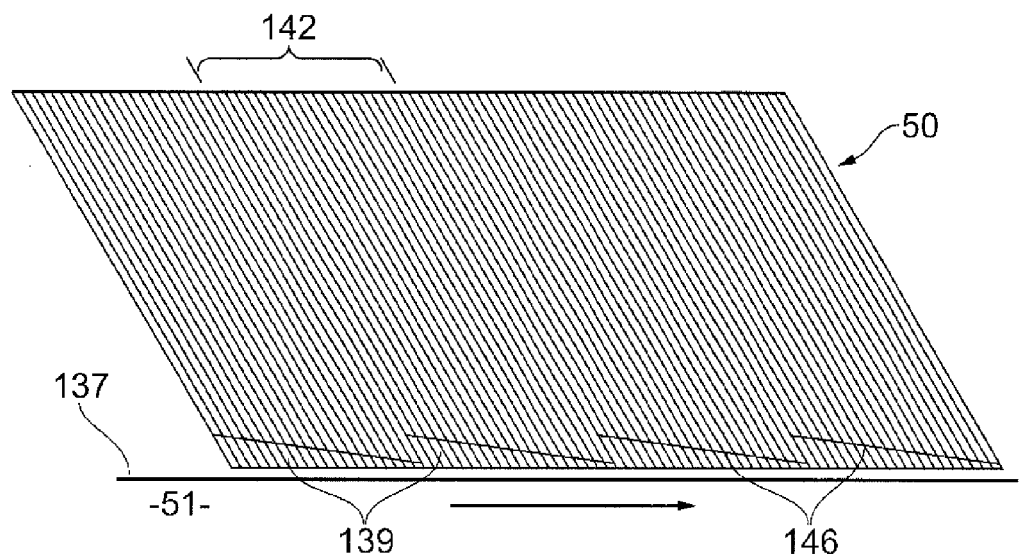
FIG. 9 is another schematic drawings showing an alternative leaf pack configuration as viewed from upstream.
Figure 10:
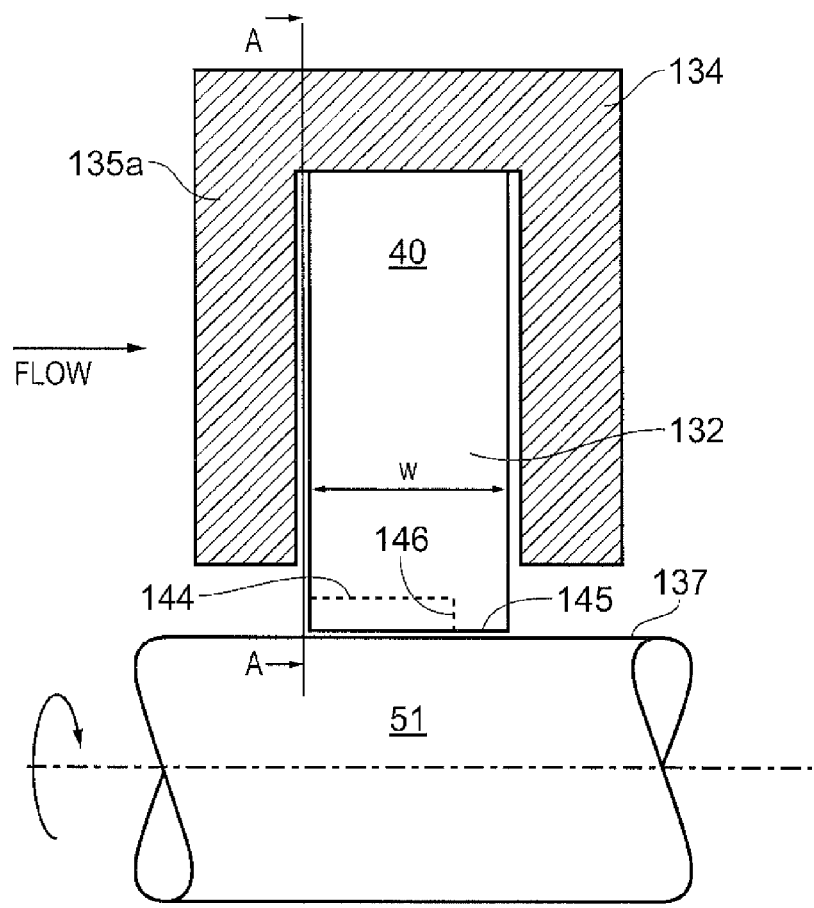
FIG. 10 is a schematic radial cross-sectional view through part of a leaf seal incorporating the leaf pack profile illustrated in FIG. 9.

For example, FIGS. 9 and 10 illustrate an arrangement in which the recesses 139 (each of which has a circumferential wedge-shaped profile similar to the arrangement of FIGS. 4 and 5) extend only partially across the axial width w of the pack, and are thus open only to the high pressure (upstream) side of the pack (illustrated on the left hand side of FIG. 10).

As illustrated most clearly in FIG. 10, each of the leaves 132 across which the recesses 139 extend in a circumferential sense thus has a stepped end edge 136 having an upstream region 144 and a downstream region 145, separated by a step 146 (the steps 146 also being illustrated in FIG. 9). The upstream region 144 of each such leaf tip is spaced radially from the surface 137 of the rotor 51 (by a distance which will depend on the circumferential position of the respective leaf in the recess), However, the downstream region 145 of each such leaf tip is provided in close, intimate relationship with the rotor surface 137.

The arrangement of FIGS. 9 and 10 is thus configured such that its recesses 139 each extend only partially across the axial width w of the pack 50 and are each open only to the high pressure (upstream) side of the pack. This type of configuration can offer advantages in some seal applications because it provides hydrodynamic lift to the upstream part of the pack 50 as a whole, whilst retaining a closer relationship between the downstream region of its deal surface 138 and the rotor surface 137, which helps to block the axial flow of fluid through the air-riding seal, thereby reducing leakage past the seal.

Figure 11:
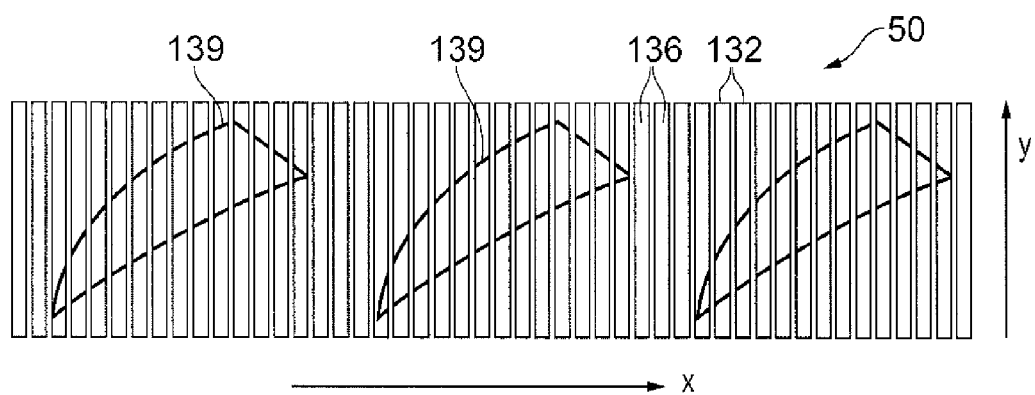
FIG. 11 is a schematic illustration showing another alternative leaf pack configuration, as viewed in a radially outward direction.

It is also to be noted that whilst the invention has been described above with particular reference to embodiments which incorporate lift-generating recesses 139 of relatively simple form, other more complex recess profiles may be provided without departing from the scope of the invention. For example, FIG. 11 illustrates schematically a section of a seal pack 50, as viewed in a radially outwards direction from the position of the rotor 51, and thus shows the end edges 136 of a series of leaves 132 in the pack. In this arrangement, recesses 139 are machined into the seal surface 138 defined collectively by the end edges 136 in such a manner as to have profiles whose circumferential dimensions (measured in the x-direction indicated on FIG. 11) vary over their axial extent, and also whose axial dimensions (measured in the y-direction indicated on FIG. 11) vary over their axial extent. It is also possible to provide the recesses in a configuration in which their radial depth (measured into the page in FIG. 11) varies over their axial extent.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A leaf seal for effecting a seal between two coaxial and relatively rotating components, the seal having an annular pack of stacked leaves, the pack being mountable to a first one of the components at root portions of the leaves and extending towards the other component such that end edges of the leaves cooperate to define a seal surface of the pack which is presented for air-riding interaction with a surface of the other component during relative rotation between the components such that, in use, a pressure drop is maintained axially across the pack; wherein the annular pack is divided into groups of leaves and the seal surface of the pack incorporates a plurality of hydrodynamic lift-generating recesses, each recess arranged circumferentially across a group, each said recess extending circumferentially across a plurality of adjacent leaves in the group, each of which leaves in the group being spaced radially from said surface of the other component along at least part of its end edge and an actual radial spacing of each leaf in the group varies over a circumferential extent of the recess.

2. A leaf seal according to claim 1, wherein said seal surface is defined as an inner bore extending through the annular pack of stacked leaves.

3. A leaf seal according to claim 1, wherein at least one of said recesses has a radial depth which varies across its circumferential extent.

4. A leaf seal according to claim 3, wherein at least one of said recesses has a tapered circumferential profile.

5. A leaf seal according to claim 1, wherein at least one of said recesses has a constant radial depth across its circumferential extent.

6. A leaf seal according to claim 1, wherein said pack has a high pressure side and a low pressure side across which said pressure drop is maintained in use, and wherein at least one of said recesses extends across the entire axial width of the group so as to be open to both the high and low pressure sides of the pack.

7. A leaf seal according to claim 6, wherein each leaf across which said at least one recess extends is spaced radially from the surface of the other component along the full length of its end edge.

8. A leaf seal according to claim 1, wherein at least one of said recesses extends only partially across the axial width of the group so as to be open to only one side of the group.

9. A leaf seal according to claim 8, wherein said pack has a high pressure side and a low pressure side across which said pressure drop is maintained in use, and wherein the or each said recess is open to the high pressure side of the pack.

10. A leaf seal according to claim 9, wherein each leaf across which said at least one recess extends has an end edge profile configured such that i) an upstream region of the end edge, adjacent the high pressure side of the pack, is spaced radially from the surface of the other component, and ii) a downstream region of the end edge, adjacent the low pressure side of the pack, is provided in closer, intimate, relationship with the surface of the other component.

11. A leaf seal according to claim 1, wherein at least one of said recesses has a radial depth which varies over its axial extent.

12. A leaf seal according to claim 1, wherein at least one of said recesses has a circumferential dimension which varies over its axial extent.

13. A leaf seal according to claim 1, wherein leaves in the group across which the lift-generating recesses do not extend circumferentially are each arranged such that their end edges are located closer to the surface of the other component than at least part of the end edges of the leaves across which the recesses do extend.

14. A gas turbine engine having one or more leaf seals according to claim 1.

* * * * *